United States Patent [19]

Scott

[11] 4,399,612
[45] Aug. 23, 1983

[54] MEASURING INSTRUMENT

[76] Inventor: Peter J. Scott, 9 Whitehall Park, London, England, N19 3TS

[21] Appl. No.: 276,798

[22] Filed: Jun. 24, 1981

[51] Int. Cl.³ .............................................. B43L 13/16
[52] U.S. Cl. ................................................. 33/20 R
[58] Field of Search .................. 33/18 R, 18 C, 20 R, 33/20 B, 20 C; 434/85, 88, 91; 434/92, 86; 350/288, 291, 299, 174, 169, 171, 121

[56] References Cited

U.S. PATENT DOCUMENTS

| 216,460 | 6/1879 | Rosquist | 33/20 C |
| 2,465,617 | 3/1949 | Trorey | 33/20 C |

FOREIGN PATENT DOCUMENTS 48010 8/1889 Fed. Rep. of Germany .... /174

Primary Examiner—Harry N. Haroian
Attorney, Agent, or Firm—Steele, Gould & Fried

[57] ABSTRACT

A measuring instrument in the form of a plotter has a part-reflecting mirror device and a measuring mark or index which may be moved in X, Y and Z directions into coincidence with an image produced by the mirror device of an object to be plotted, contoured or measured, and means associated with the measuring mark or index for producing a plot, contour or measurement of the object, the mirror device comprising two parallel sheets of transparent material having the same optical properties and the same thickness, the image reflected by one or both of the adjacent surfaces being substantially stronger than any images reflected by the remaining surfaces of the sheets.

24 Claims, 12 Drawing Figures

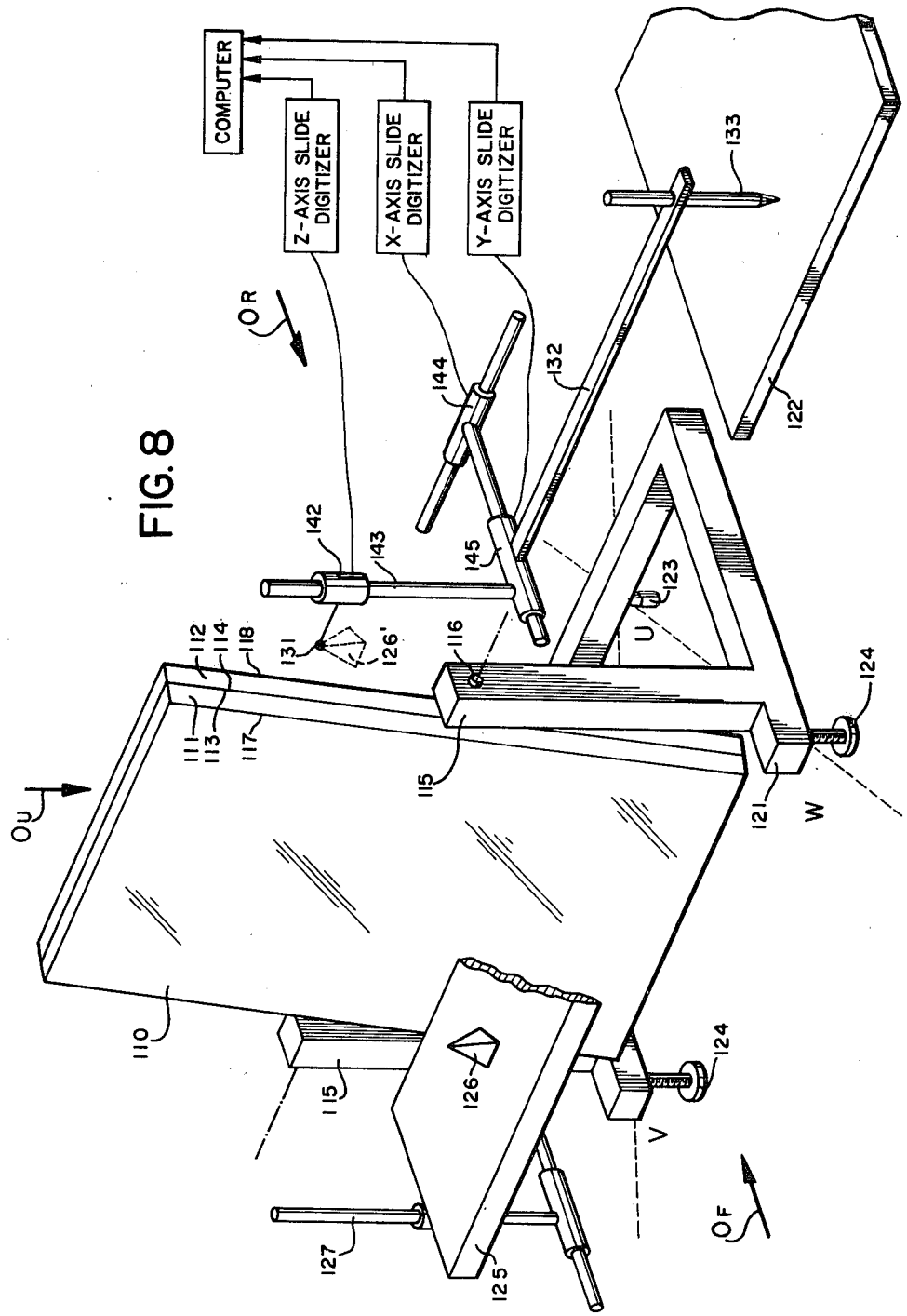

MEASURING INSTRUMENT

BACKGROUND OF THE INVENTION

1. Field of the Invention

This invention concerns a part-reflecting mirror device for use in an optical instrument and, although the invention is not necessarily so restricted, it is more particularly concerned with a measuring instrument, such as a plotter, provided with such a mirror device, for producing a plot, contour or measurement of a small object of complicated shape, e.g. a pot shard or a denture cast used in the study of orthodontics.

2. Prior Art

Any form of direct measurement of such an object is necessarily limited, and individual measurements of parts of such an object usually have to be effected independently of each other since a measuring tool capable of reaching all points of such an object is very difficult to design. Detailed measurement of such an object in a defined and constant reference system is usually practical only in some form of indirect measurement where the necessary instrument is not in contact with the object. For example, the object may be photographed from two positions, and the two photographs may be used in a stereo-plotting instrument to provide a plot of the object from which the required measurement or measurements may be made. Such stereo-plotting instruments, however, are very expensive, necessitate considerable operator training, and are subject to the errors arising from photographic distortion.

If, however, an attempt were to be made to produce the required plot of the object by disposing the latter on one side of a conventional part-reflecting mirror device and producing the plot by moving a measuring mark or index about an image of the object on the opposite side of the conventional mirror device, parallax errors would occur by reason of the fact that some of the rays of light which would be used to produce the plot would pass through the mirror device and be refracted thereby, while other rays of light would merely be reflected by the mirror device without passing therethrough, and there would thus be differences in the effective optical paths of the rays.

SUMMARY OF THE INVENTION

According to the present invention, there is therefore provided a part-reflecting mirror device for use in an optical instrument comprising two parallel sheets of transparent material having the same optical properties and the same thickness, the image reflected by one or both of the adjacent surfaces of the sheets being substantially stronger than any images reflected by the remaining surfaces of the sheets.

Preferably, at least one of the adjacent surfaces is coated to increase its reflectance. Thus the adjacent surfaces may be half-silvered or coated with aluminium or titanium. Alternatively, or additionally, the non-adjacent surfaces of the sheets may be bloomed to reduce their reflectance.

Thus in the case of a part-reflecting mirror device according to the present invention, parallax errors may be avoided because the optical paths of all the rays of light which pass through the mirror device and which are used in such a plot may be effectively the same.

Preferably, the two sheets contact each other and are secured together to form a unit. This obviates the difficulty which there would otherwise be in ensuring that the two sheets were kept parallel to each other at all times.

The invention also comprises a plotter having a device as set forth above, the plotter having a measuring mark or index which may be moved in X, Y and Z directions, of a three dimensional coordinate system having mutually perpendicular axes, into coincidence with an image, produced by the mirror device, of an object to be plotted, contoured or measured, and means associated with the measuring mark or index for producing a plot, contour or measurement of the object.

Such a plotter may be produced for a small fraction of the cost of a stereo-plotting instrument, while an operator may be trained to use such a plotter much more quickly than to use such an instrument.

The mirror device may be supported by a mirror support and may be pivotable with respect thereto, means being provided for releasably clamping the mirror device to the mirror support in a desired pivotal position.

There may be an object table which is disposed on one side of the mirror device and which is adapted to support the object, and a plotting stand which is disposed on the opposite side of the mirror device and which is provided with the measuring mark or index. The plotting stand may be mounted on and may be movable over a plotting table, the plotting stand having means for carrying a marking member for marking on material supported by the plotting table.

In an alternative embodiment there may be a measuring mark or index disposed on the opposite side of the mirror device. The mark is carried on a three dimensional orthogonal slide system. The slides may be electronically digitized to enable coordinates to be passed to a computer. The two dimensional horizontal (X,Y) movement of the slides may be coupled to a marking pencil which produces a plot over a plotting table.

There may be adjustment means for adjusting the mirror device so as to adjust the position of the image.

The mirror support may comprise a base plate, and the adjustment means may comprise means for rotating the base plate about two orthogonal substantially horizontal axes neither of which coincides with the normal to the mirror device.

The object table may be movable horizontally toward and away from the mirror device, and may also be movable over the plotting table in X and Y directions.

In the alternative embodiment, there may be means for producing in digital form an indication of the position at any moment of the measuring mark or index, and for producing therefrom a plot or contour of the object to a desired scale.

The invention also comprises a method for producing a plot, contour or measurement of an object by the use of the plotter set forth above, the method comprising the steps of: disposing the object on one side of the mirror device; moving the measuring mark or index, which is disposed on the opposite side of the mirror device, about a portion of the periphery of an image of the object which is disposed on the opposite side; and employing the measuring mark or index to control the production of the plot, contour or measurement.

BRIEF DESCRIPTION OF THE DRAWINGS

For the purpose of illustrating the invention there are shown in the drawings forms which are presently preferred, it being understood, however, that this invention is not limited to the precise arrangements and instrumentalities shown.

DETAILED DESCRIPTION OF THE PREFERRED EMBODIMENTS

Figure 1:
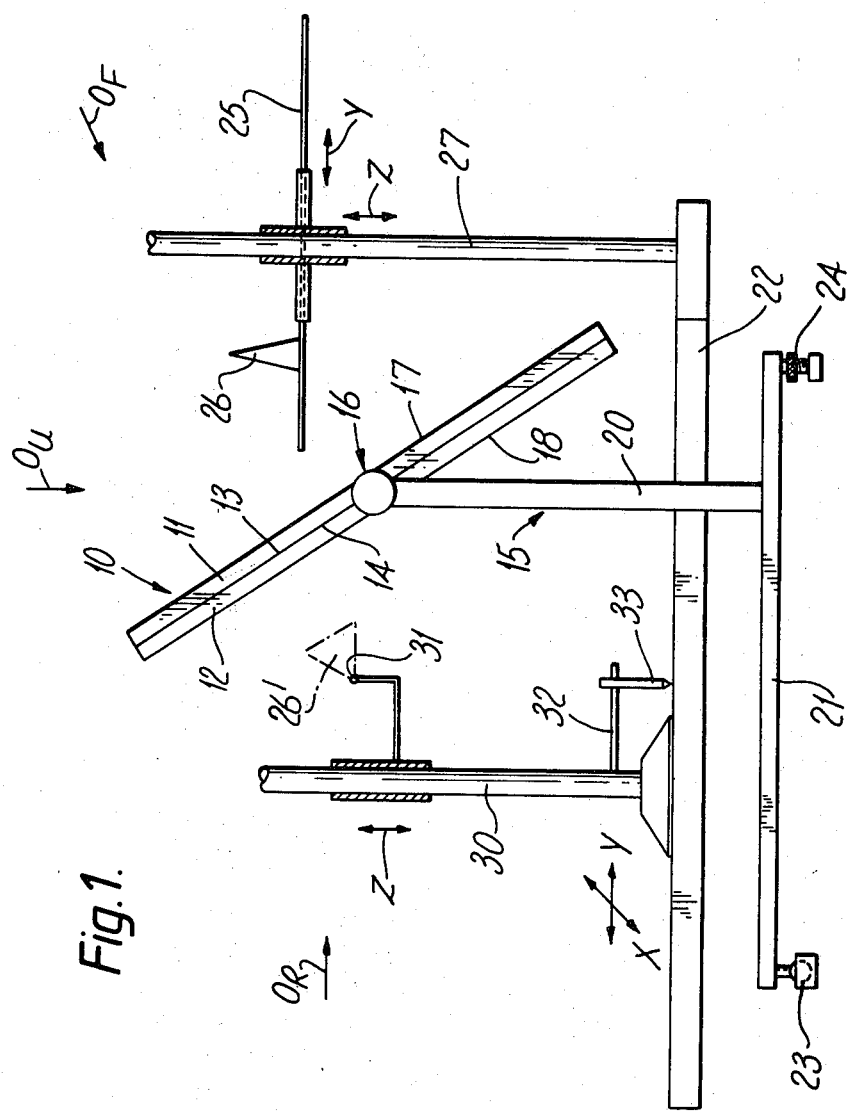
FIG. 1 is a diagrammatic elevation of a plotter provided with a part-reflecting mirror device according to the present invention.

In FIG. 1 there is shown a plotter which comprises a part-reflecting mirror device 10 having two parallel rectangular sheets 11, 12 of glass or other transparent material. The sheets 11, 12 have the same optical properties and the same thickness, the sheets 11, 12 contacting each other and being secured together to form a unit. Alternatively, as explained below, the sheets 11, 12 may be spaced from each other provided they are maintained parallel to each other at all times.

The sheets 11, 12 have adjacent planar surfaces 13, 14 at least one of which is semi-silvered, or is coated with aluminum or titanium to increase the reflectance. This ensures that the image reflected by the adjacent surfaces 13, 14 is substantially stronger than any images reflected by the non-adjacent surfaces 17, 18 of the sheets 11, 12. The same effect may also be produced by blooming, or coating, the non-adjacent surfaces 17, 18 to reduce their reflectance.

It is presently preferred that the thickness of each of the sheets 11, 12 be at least 6 mm to ensure that the mirror device 10 is inflexible, any flexing of the mirror device 10 being undesirable since it will warp the image to be produced thereby. If the sheets are thinner other stiffening means may be utilized.

The mirror device 10 is supported by a mirror support 15 and is pivotable with respect to the latter about pivots 16. Means (not shown) are provided for releasably clamping the mirror device 10 to the mirror support 15 in any desired pivotal position.

Figure 2:
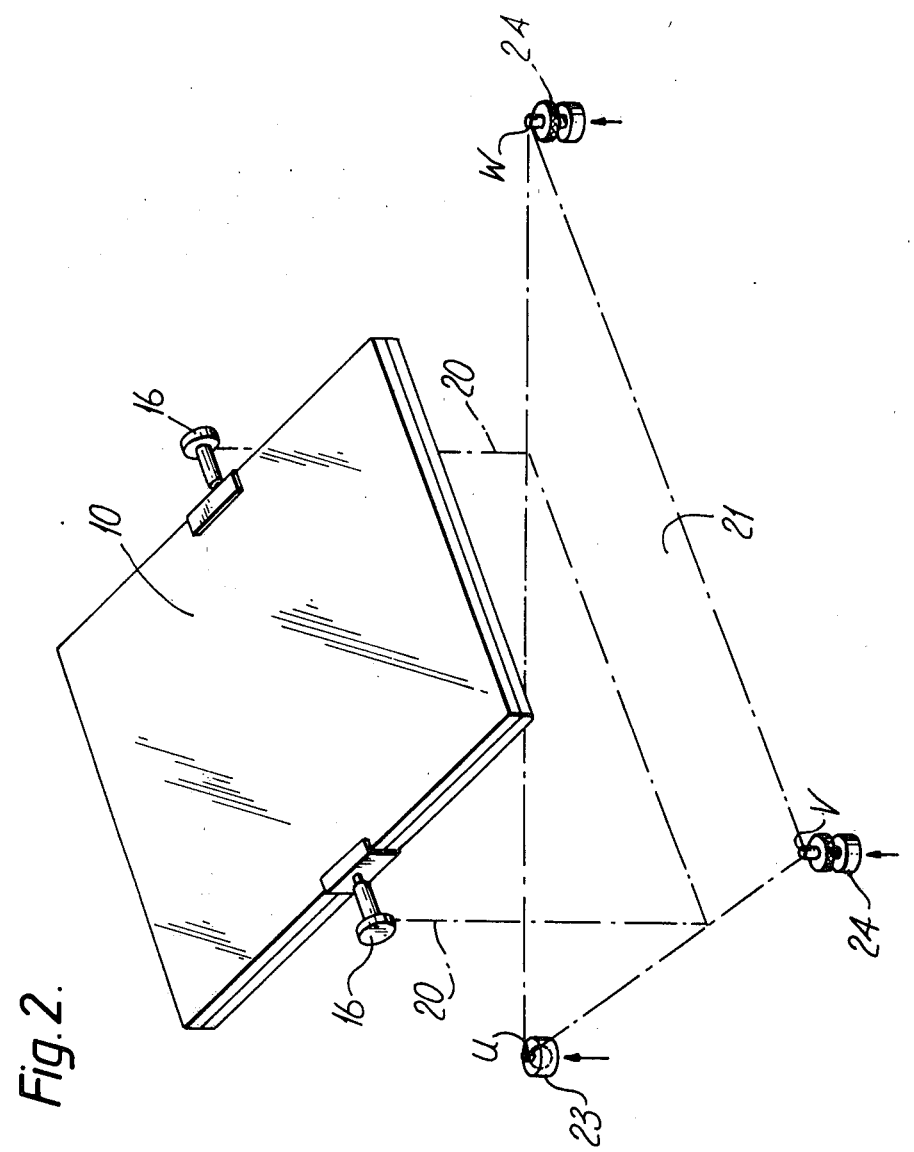
FIG. 2 is a diagrammatic perspective view of a part of the plotter shown in FIG. 1.

The mirror support 15 comprises two vertically extending support members which are mounted on a triangular base plate 21 whose corners are indicated in FIG. 2 as U, V, W, the angle VUW being 90°. The support members 20 extend through a plotting table 22 beneath which the base plate 21 is mounted.

The base plate 21 may be rotated about two orthogonal substantially horizontal axes neither of which coincides with the normal to the mirror device 10. For this purpose, as best shown in FIG. 2, the sides UV and UW of the base plate 21 are disposed at angles of 45° with respect to the axis of the pivots 16. The base plate 21 is supported at the corner U on a ball and socket device 23, and is supported at each of its corners V and W on a vertically extending adjustable screw 24.

Thus by rotating the screw 24 at the corner V, the base plate 21 will be rotated about the axis UW, while by rotating the screw 24 at the corner W, the base plate 21 will be rotated about the axis UV.

An object table 25 is disposed on one side, e.g., the right hand side as shown, of the mirror device 10 and is adapted to support an object 26 to be plotted, contoured, or measured, the object 26 being shown in the drawings as a pyramid-shaped object. The object table 25 is supported by a stand 27 so that it may be moved horizontally in Y directions towards and away from the mirror device 10, and is also movable vertically upwardly and downwardly in Z directions.

A plotting stand 30 is disposed on the side of the mirror device 10 opposite to that occupied by the object table 25, the plotting stand 30 being mounted on the plotting table 22 and being movable horizontally thereover in X and Y directions.

The plotting stand 30 is provided with a measuring mark or index 31 which may be moved into coincidence with a point on an image 26' of the object 26 supported on the object table 25. The measuring mark or index 31 may be moved vertically with respect to the plotting stand 30 upwardly and downwardly in Z directions and may be clamped (by means not shown) in a desired position.

Secured to the plotting stand 30 is a pencil support member 32 for supporting a plotting pencil or other marking member 33 capable of marking on plotting paper or other material (not shown) supported by the plotting table 22. The marking member 33 is disposed vertically below the measuring mark or index 31. Thus movement of the plotting stand 30 over the plotting table 22 so as to enable the measuring mark or index 31 to be moved around a predetermined portion of the periphery of the image 26' will produce a corresponding plot of the image 26' on the plotting paper.

By rotating the screws 24, the image 26' may be levelled with respect to a datum. Thus, for instance, the bottom surface of the image 26' may be adjusted to be perfectly horizontal.

When measuring an object within a defined three dimensional framework, it is usually desirable to make a selected axis or surface of the object coincide with an axis or surface of the framework. For this reason, some means of levelling the object must be provided. This could be achieved by providing the object table 25 with two horizontal levelling axes. This would have the result, however, that rotation of the object 26 about these axes would rotate the image 26' about the image of these axes. With the mirror device 10 in any but the vertical position, these axes would not be exactly horizontal and it would then be difficult for the operator to predict the effect of an applied rotation. Since, however, it is the mirror device 10 which is levelled, rotation of the mirror device 10 about one of the horizontal axes then produces rotation of the image 26' about the same axis, and the advantage is that the image 26' always rotates about horizontal axes no matter what the attitude of the mirror device 10. As indicated above, the only requirements are that the axes about which the mirror device 10 can be rotated are mutually perpendicular, substantially horizontal, and do not coincide with the normal to the mirror device 10, since rotation of the mirror device 10 about its own normal will not move the image 26'. This latter requirement means that, with the mirror device 10 vertical, the axes must be placed at 45° to the normal, which is itself horizontal.

In operation, if it is desired to produce, for example, a contour at a specific height of the object 26, the object 26 is placed on the object table 25 on one side of the mirror device 10, and the mirror device 10 is clamped in a suitable pivotal position as discussed below. The image 26', which will then be produced on the opposite side of the mirror device 10, is levelled by rotating the screws 24, and the measuring mark or index 31 is then moved into coincidence with a point on the contour of the image 26', this being done by suitably adjusting the vertical position of the measuring mark or index 31 on the plotting stand 30 in the Z direction and by suitably adjusting the horizontal position of the plotting stand 30 in the X and Y directions. The measuring mark or index 31 is now clamped to the plotting stand 30 and the latter is moved over the plotting table 22 in the X and Y directions so as to traverse the measuring mark or index 31 around the said contour, the operator moving his head appropriately during this operation to enable the object 26 to be viewed all the way around. As the plotting table 22 is so moved in the X and Y directions, the marking member 33 plots the contour on plotting paper (not shown) which has been placed on the plotting table 22. Thus the movement of the measuring mark or index 31 from point to point on the image is not hindered by the physical presence of the object 26 and does not involve moving the latter.

Figure 3A:
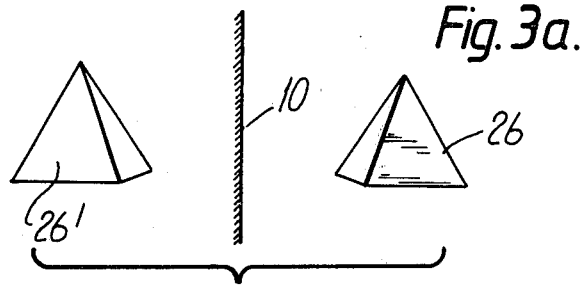
FIGS. 3(a) to 3(e) illustrate the operation of the plotter of FIGS. 1 and 2.
Figure 3B:
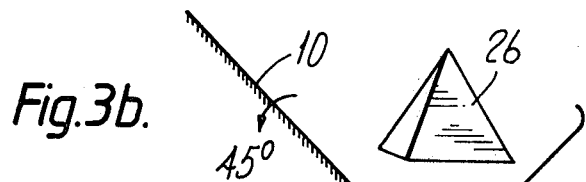
Figure 3C:
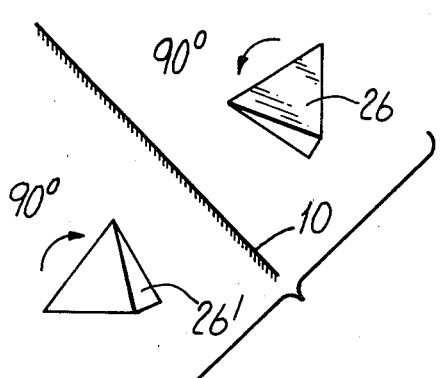

FIGS. 3(a) to 3(e) illustrate the effects produced by the position of the object 26 and by the particular pivotal position at which the mirror device 10 is clamped during the procedure described in the preceding paragraph. As shown in FIG. 3(a), if the mirror device 10 is vertical, the image 26' is at the same height above the plotting table 22 as the object 26. If the mirror device 10 is moved through 45° to the position shown in FIG. 3(b), the image 26' will be rotated through 90° in the same direction and about the same axis. If the object 26 is now rotated by 90° in the same direction into the position shown in FIG. 3(c) image 26' will be restored to the attitude shown in FIG. 3(a). When the parts are in the FIG. 3(c) position, an operator can place his head directly above the image 26', thus viewing the object 26 as if from directly overhead. The operator, by moving his head from side to side, can then obtain a view of the image 26' from all sides. The FIG. 3(c) position is thus suitable for the majority of purposes for which the plotter would be used.

For unusual tasks, however, such as measuring an internal portion of the object, the mirror device 10 may be better placed in the vertical position shown in FIG. 3(a), or at some angle between 45° and the vertical. It is for this reason that the mirror device 10 can be clamped in any desired pivotal position.

Figure 3D:
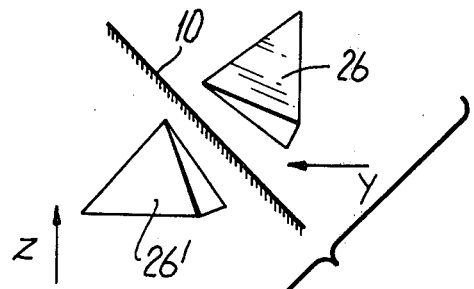
Figure 3E:
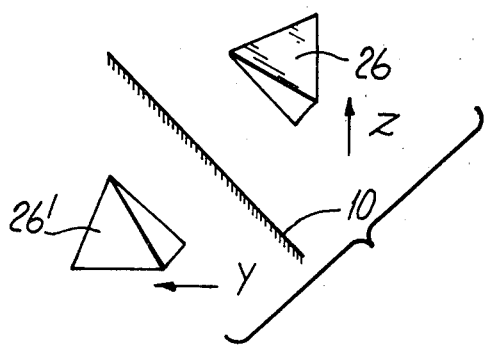

The object table 25 also needs to be adjusted to a position suitable for the particular plot being taken. As will be seen by comparing FIGS. 3(a) and 3(b), if the mirror device 10 is moved between the vertical and 45° positions, the Z height of the image 26' will be altered. If the mirror device 10 would otherwise have to be in the vertical position shown in FIG. 3(a) in order to allow for the necessary movements of the measuring mark or index 31 in the Z direction during the plot, then if in fact the mirror device 10 is moved to the 45° position of FIG. 3(b), the object 26 must, as shown in FIG. 3(d), be moved in the Y direction towards the mirror device 10 in order to move the image 26' back to the same height as in FIG. 3(a). The image 26' may now be too close to the mirror device 10 to allow free movement of the measuring mark or index 31. In order, therefore, to move the image 26' in the Y direction away from the mirror device 10, as shown in FIG. 3(e), the object 26 must be moved upwardly in the Z direction.

The surface of the plotting table 22 should desirably be flat to within ±0.05 mm since any variation in this surface directly affects the Z coordinate. The surface could also be free from obstruction. To achieve this, the base plate 21 is placed under the plotting table 22.

When the mirror device 10 is in the 45° position, the operator will view the image 26' from an overhead position $O_u$ (FIG. 1). In the upright position he will view from the object side of the mirror device at $O_F$. The plotting stand 30 will then be a fairly long way from him, as seen in FIG. 1, although an extension handle (not shown) can be attached to the plotting stand 30 allowing it to be maneuvered from a position closer to the operator. If this is found to be uncomfortable, the operator may sit behind the mirror device at $O_R$, and observe the reflection of the measuring mark or index 31 in coincidence with the object 26. There is a drawback in using this position, however, in that, to move the image of the measuring mark or index 31 away from him the operator must move the measuring mark itself towards himself.

The significance of providing the mirror device 10 with the two sheets 11, 12 will now be discussed with reference to FIGS. 4-7.

Figure 4:
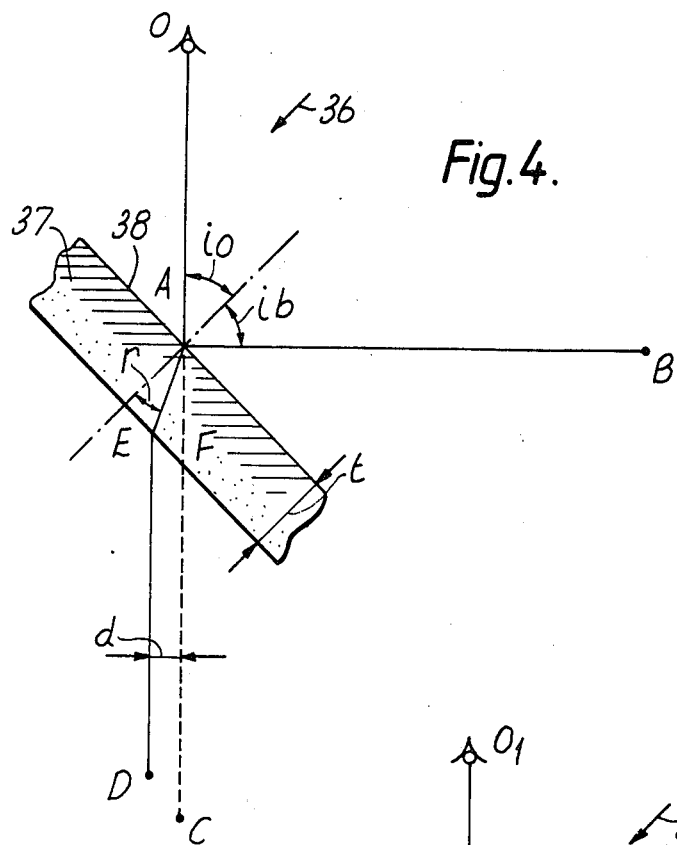
FIGS. 4–7 are diagrams illustrating the optical principles underlying a part-reflecting mirror device according to the present invention; and, FIG. 8 is a perspective view, with portions cut away, showing an alternative embodiment of the invention.
Figure 5:
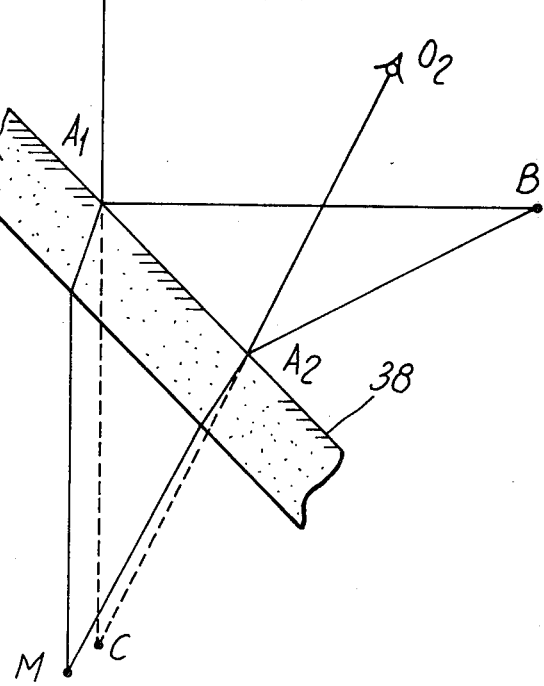

In FIGS. 4 and 5 there is shown a conventional part-reflecting mirror device 36 consisting of a single sheet of glass 37 having a half-silvered surface 38. FIGS. 4 and 5 illustrate the effect of using such a conventional mirror device in a plotter as described above, FIG. 4 illustrating the effect when monocular viewing is effected from a point O, and FIG. 5 illustrating the effect when binocular viewing is effected from point $O_1$, $O_2$.

As shown in FIG. 4, an object B is imaged at C by reflection at the surface 38 at A, such that AB=AC, angle $i_o = i_b$, and OAC is a straight line. The optical path of the light from a measuring mark D, however, in order to coincide with the line AO, will be DEAO, where DE, AO and CF are parallel. The line of sight DE is refracted by the glass sheet 37 to assure the direction EA such that $$\frac{\sin i_o}{\sin r} = \frac{na}{ng} \text{ where}$$

"na" is the refractive index of air and "ng" is the refractive index of the glass of the sheet 37.

Moreover, because the sheet 37 is optically denser than the air, the light cannot travel as quickly along AE, and consequently the length AED is not equal to the length AC. The meauring mark D is thus not only displaced laterally by a displacement d, shown in FIG. 4, from its desired position C, but is closer to the glass sheet 37.

When binocular vision is considered, as illustrated in FIG. 5, if a measuring mark M is to coincide with the image C, the light paths from the measuring mark M and the object B should enter the eyes of the observer at points $O_1$, $O_2$ along the same direction $A_1$, $O_1$ and $A_2$, $O_2$ respectively. Clearly the measuring mark M will thus not coincide with the image C when it appears to the observer to do so. It can be shown that the displacement d (FIG. 4)=t[sin (i)−cos (i) tan (r)], where "i" is the angle of incidence of the light ray from the object B.

Because of this variation of the displacement d with the angle of incidence i, the measuring mark M will no longer coincide with the image of the object N when the observer moves his eyes to a new position. Unless, therefore, he can return his eyes to exactly the same position every time, he will not be able to repeat a reading. As a numerical example, if the glass sheet 37 is 6 mm thick, and if the observer views the image C from directly behind the object B and places the measuring mark M in coincidence, then a movement of the observer's eyes to where the angle of incidence i is about 40° will produce an apparant shift of the measuring mark M of about 1.5–2 mm.

Thus, as will be appreciated from the above, the use of a conventional part-reflecting mirror device comprising one single sheet of glass gives rise to parallax errors due to the fact that the image arrives at the observer's eye or eyes without passing through any glass, since it is reflected from the front face of the mirror device, but the light from the measuring mark is refracted through the glass.

Figure 6:
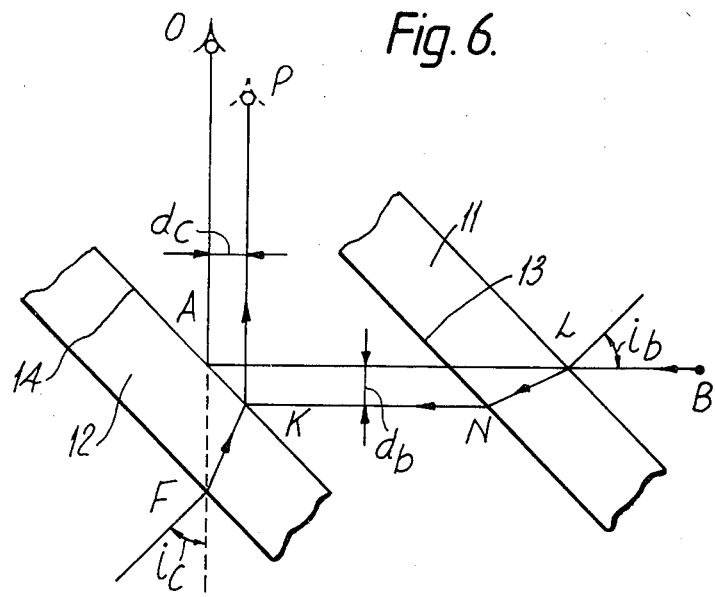

FIG. 6 therefore illustrates the reason for providing the mirror device with two parallel sheets 11, 12 of glass or other transparent material. If the measuring mark were placed at C and the sheet 12 only were present, then the light path from C to the position P to which the observer would have to move his eye from O to see C, is CFKP. In order to make the light path from the object B coincide with this, the sheet of glass 11, which is identical to and parallel to the sheet 12, is introduced between B and A.

By simple geometry, the angle of incidence $i_b$ of BA at L is the same as the angle of incidence $i_c$ of CA at F, and consequently the displacement $d_b$ of BA to NK is equal to the displacement $d_c$ from CA to KP. Thus with the measuring mark in its desired position at C, both the ray from C and the ray from B will emerge along KP. The observer will thus see the measuring mark in coincidence with the image.

Figure 7:
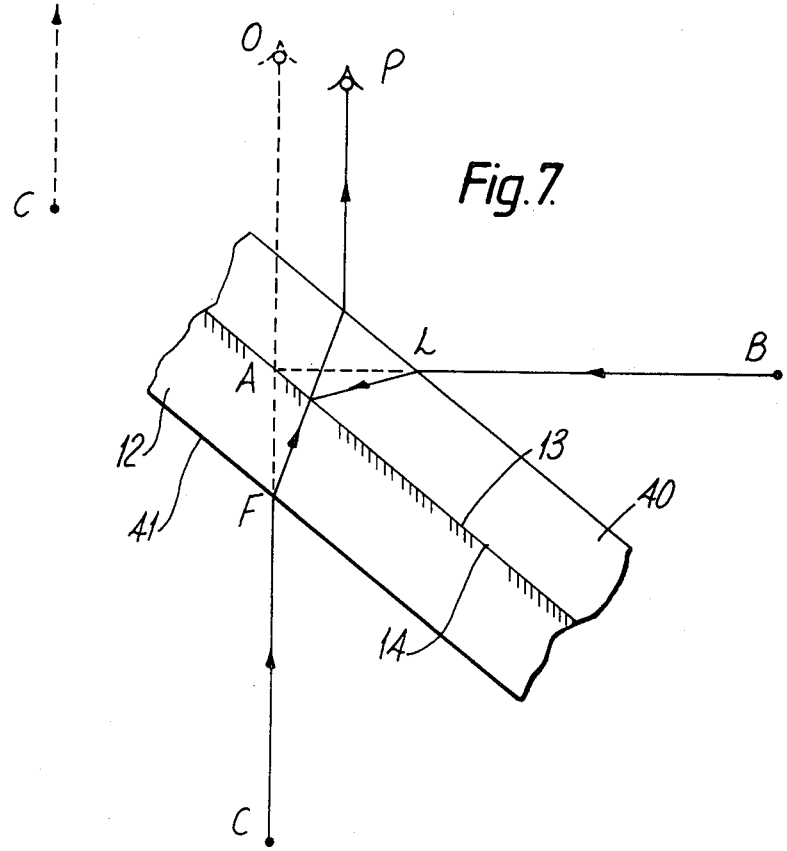

Once the rays NK and FK have emerged along the same line from K, their coincidence cannot be disturbed by passage through any further optical components. It is possible, therefore, to place the two sheets 11, 12 in contact as shown in FIG. 7. This will save the mechanical complication of making the two sheets 11, 12 remain parallel no matter what the attitude of the reflecting surface 14.

The front surface 40 (FIG. 7) of the sheet 11, the surfaces 13, 14, and the rear surface 41 of the sheet 12 will each create a reflected image of its own which would confuse an operator. This is, however, overcome by semi-silvering or otherwise increasing the reflectance of the surface 14 (and/or, if desired, the surface 13) which then produces a dominant image, while still allowing the operator to see the measuring mark. Alternatively, or additionally, such a dominant image may be produced by blooming or coating the surfaces 40, 41 to reduce their reflectance.

FIG. 8 illustrates an alternative embodiment of a measuring instrument according to this invention, in the form of plotter which comprises a part-reflecting mirror device 110 having two parallel rectangular sheets 111, 112 of glass or other transparent material. The sheets 111, 112 have the same optical properties and the same thickness, the sheets 111, 112 contacting each other and being secured together to form a unit. Alternatively, as explained below, the sheets 111, 112 may be spaced from each other provided they are maintained parallel to each other at all times.

The sheets 111, 112 have adjacent planar surfaces 113, 114 at least one of which is semi-silvered, or is coated with aluminum or titanium to increase the reflectance. This ensures that the image reflected by the adjacent surfaces 113, 114 is substantially stronger than any images reflected by the non-adjacent surfaces 117, 118 of the sheets 111, 112. The same effect may also be produced by blooming, or coating, the non-adjacent surfaces 117, 118 to reduce their reflectance.

It is presently preferred that the thickness of each of the sheets 111, 112 be at least 6 mm to ensure that the mirror device 110 is inflexible, any flexing of the mirror device 110 being undesirable since it will warp the image to be produced thereby. If the sheets are thinner other stiffening means may be utilized.

The mirror device 110 is supported by a mirror support 115 and is pivotable with respect to the latter about pivots 116. Means (not shown) are provided for releasably clamping the mirror device 110 to the mirror support 115 in any desired pivotal position.

The mirror support 115 comprises two vertically extending support members which are mounted on a base frame 121 whose corners are indicated as U, V, W, the angle VUW being 90°.

The base frame 121 may be rotated about two orthogonal substantially horizontal axes neither of which coincides with the normal to the mirror device 110. For this purpose, the sides UV and UW of the base frame 121 are disposed at angles of 45° with respect to the axis of the pivots 116. The base frame 121 is supported at the corner U on a ball and socket device 123, and is supported at each of its corners V and W on a vertically extending adjustable screw 124.

Thus by rotating the screw 24 at the corner V, the base frame 121 will be rotated about the axis UW, while by rotating the screw 124 at the corner W, the base frame 121 will be rotated about the axis UV.

An object table 125 is disposed on one side, e.g., the left hand side as shown, of the mirror device 110 and is adapted to support an object 126 to be plotted, contoured, or measured, the object 126 being shown in the drawings as a pyramid-shaped object. The object table 125 is supported by a stand 127 so that it may be moved horizontally in Y directions towards and away from the mirror device 110, and is also movable vertically upwardly and downwardly in Z directions.

A measuring mark or index 131 is disposed on the side of the mirror device oposite to that occupied by the object table. The mark is carried on a three dimensional slide system with X and Y slides 144, 145 being substantially horizontal and the Z slide 142 being normal to the X and Y slides.

The mark may be moved into coincidence with a point on the image 126' of the object 126.

Secured to the base of the slide column 143 is a pencil support member 132 for supporting a plotting pencil or other marking member 133 capable of marking on plotting paper or other material (not shown) supported by the plotting table 122. Thus movement of the measuring mark 131 around a predetermined portion of the periphery of the image 126' will produce a corresponding plot of the image 126' on the plotting paper.

Alternatively a low-power pointing microscope may be put in place of the pencil 133. If a radiograph, photograph or plan is placed on the plotting table 122, pointings may be made to salient points on the radiograph, photograph or plan, allowing (X,Y) coordinates to be taken from the slides 144 and 145.

By rotating the screws 124, the image 126' may be levelled with respect to a datum. Thus, for instance, the bottom surface of the image 126' may be adjusted to be perfectly horizontal.

When measuring an object within a defined three dimensional framework, it is usually desirable to make a selected axis or surface of the object coincide with an axis or surface of the framework. For this reason, some means of levelling the object must be provided. This could be achieved by providing the object table 125 with two horizontal levelling axes. This would have the result, however, that rotation of the object 126 about these axes would rotate the image 126' about the image of these axes. With the mirror device 110 in any but the vertical position, these axes would not be exactly horizontal and it would then be difficult for the operator to predict the effect of an applied rotation. Since, however, it is the mirror device 110 which is levelled, rotation of the mirror device 110 about one of the horizontal axes then produces rotation of the image 126' about the same axis, and the advantage is that the image 126' always rotates about horizontal axes not matter what the attitude of the mirror device 110. As indicated above, the only requirements are that the axes about which the mirror device 110 can be rotated are mutually perpendicular, substantially horizontal, and do not coincide with the normal to the mirror device 110, since rotation of the mirror device 110 about its own normal will not move the image 126'. This latter requirement means that, with the mirror device 110 vertical, the axes must be placed at 45° to the normal, which is itself horizontal.

In operation, if it is desired to produce, for example, a contour at a specific height of the object 126, the object 126 is placed on the object table 125 on one side of the mirror device 110, and the mirror device 110 is clamped in a suitable pivotal position as discussed above. The image 126', which will then be produced on the opposite side of the mirror device 110, is levelled by rotating the screws 124, and the measuring mark or index 131 is then moved into coincidence with a point on the contour of the image 126', this being done by suitably adjusting the vertical position of the measuring mark or index 131 on the Z slide 142 in the Z direction and by suitably adjusting the horizontal position of the measuring mark 130 in the X and Y directions. The measuring mark or index 31 is now clamped to the Z slide 142 and the latter is moved in the X and Y directions so as to traverse the measuring mark or index 131 around the contour, the operator moving his head appropriately during this operation to enable the object 126 to be viewed all the way around. As the measuring mark 131 is so moved in the X and Y directions, the marking member 133 plots the contour on plotting paper (not shown) which has been placed on the plotting table 122. Thus the movement of the measuring mark or index 131 from point to point on the image is not hindered by the physical presence of the object 126 and does not involve moving the latter. The alternative embodiment functions optically as described in connection with FIGS. 1-7, although for example, it is the measuring mark, rather than the plotting stand (or frame), which would be a fairly long way from the observer on the object side of the mirror device at O$_f$.

This invention may be embodied in other specific forms without departing from the spirit or essential attributes thereof, and accordingly, reference should be made to the appended claims, rather than to the foregoing specification as indicating the scope of the invention.

I claim:

1. A measuring instrument, comprising:
   a plotting table;
   a part-reflecting mirror device having two parallel sheets of transparent material with the same optical properties and the same thickness, an image reflected by at least one of the adjacent surfaces of the sheets being substantially stronger than any images reflected by the remaining surfaces of the sheets;
   a measuring mark which may be moved in all directions of a three dimensional coordinate axis system, (X, Y, Z) into coincidence with an image, produced by the mirror device of an object to be plotted;
   an object table which is disposed on one side of the mirror device and which is adapted to support the object;
   a plotting stand mounted on and movable over the plotting table, which is disposed on the opposite side of the mirror device and on which is disposed the measuring mark; and,
   means operable in conjunction with the measuring mark for producing a measured plot of the object.

2. A measuring instrument as claimed in claim 1, wherein at least one of the adjacent surfaces of the mirror device is coated to increase its reflectance.

3. A measuring instrument as claimed in claim 2, wherein at least one of the adjacent surfaces of the mirror device is half-silvered.

4. A measuring instrument as claimed in claims 1 or 2, wherein the non-adjacent surfaces of the sheets of the mirror device are bloomed to reduce their reflectance.

5. A measuring instrument as claimed in claims 1 or 2, wherein the two sheets of the mirror device contact each other and are secured together to form a unit.

6. A measuring instrument as claimed in claim 1, further comprising:
   a mirror support on which the mirror device is pivotally mounted; and
   means for releasably clamping the mirror device to the mirror support in a desired pivotal position.

7. A measuring instrument as claimed in claim 1, further comprising the plotting stand having means for carrying a marking member for marking on material supported by the plotting table.

8. A measuring instrument as claimed in claim 1, further comprising adjustment means for adjusting the mirror device so as to adjust the position of the image of said object.

9. A measuring instrument as claimed in claim 1, further comprising a base plate for the mirror support; and, adjustment means for rotating the base plate about two orthogonal substantialy horizontal axes neither of which coincides with the normal to the mirror device.

10. A measuring instrument as claimed in claim 9, wherein the base plate is mounted beneath the plotting table.

11. A measuring instrument as claimed in claim 1, wherein the object table is movable horizontally toward and away from the mirror device, and is also movable vertically.

12. A measuring instrument as claimed in claim 1, wherein the measuring mark is movable vertically with respect to the plotting stand in the Z direction and the plotting stand is movable over the plotting table in the X and Y directions.

13. A measuring instrument as claimed in claim 1, further comprising means for producing in digital form an indication of the position of the measuring mark at any moment, and for producing therefrom a digital record of the object.

14. A measuring instrument as claimed in claims 1 or 2, further comprising a three dimensional orthogonal slide system for carrying the measuring mark.

15. A measuring instrument as claimed in claim 14, further comprising means for carrying a marking member coupled for movement together with the horizontal movement of the slide system.

16. A method for producing a measured plot of an object by the use of the measuring instrument claimed in claim 1, comprising the steps of:
- disposing the object on one side of the mirror device;
- moving the measuring mark, which is disposed on the opposite side of the mirror device, about a portion of the periphery of an image of the object which is disposed on the opposite side; and,
- employing the measuring mark to control the production of the plot.

17. A measuring instrument, comprising:
- a part-reflecting mirror device having two parallel sheets of transparent material with the same optical properties and the same thickness, an image reflected by at least one of the adjacent surfaces of the sheets being substantially stronger than any images reflected by the remaining surfaces of the sheets;
- a measuring mark which may be moved in all directions of a three dimensional coordinate axis system (X, Y, Z) into coincidence with an image, produced by the mirror devcie, of an object to be measured;
- an object table which is disposed on one side of the mirror device and which is adapted to support the object; and,
- means operable in conjunction with the measuring mark for producing a digital record of the object.

18. A measuring instrument as claimed in claim 17, wherein at least one of the adjacent surfaces of the mirror device is coated to increase its reflectance.

19. A measuring instrument as claimed in claim 18, wherein at least one of the adjacent surfaces of the mirror device is half-silvered.

20. A measuring instrument as claimed in claims 17 or 18, wherein the non-adjacent surfaces of the sheets of the mirror device are bloomed to reduce their reflectance.

21. A measuring instrument as claimed in claim 17, wherein the two sheets of the mirror device contact each other and are secured together to form a unit.

22. A measuring instrument as claimed in claim 17, further comprising adjacent means for adjusting the mirror device so as to adjust the position of the image of said object.

23. A measuring instrument as claimed in claim 17, further comprising a three dimensional orthogonal slide system for carrying the measuring mark and a digitizer for each of the dimensional slides.

24. A measuring instrument, comprising:
- a part-reflecting mirror device having two parallel sheets of transparent material with the same optical properties and the same thickness, an image reflected by at least one of the adjacent surfaces of the sheets being substantially stronger than any images reflected by the remaining surfaces of the sheets;
- a measuring mark which may be moved in all directions of a three dimensional coordinate axis system (X, Y, Z) into coincidence with an image, produced by the mirror device, of an object to be measured and recorded;
- an object table which is disposed on one side of the mirror device and which is adapted to support the object; and,
- means operable in conjunction with the measuring mark for recording the measurements of the object.

* * * * *